(12) United States Patent
Gao et al.

(10) Patent No.: US 9,426,522 B2
(45) Date of Patent: Aug. 23, 2016

(54) EARLY RENDERING FOR FAST CHANNEL SWITCHING

(75) Inventors: Qiang Gao, San Diego, CA (US); Peisong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2172 days.

(21) Appl. No.: 11/775,478

(22) Filed: Jul. 10, 2007

(65) Prior Publication Data

US 2009/0016445 A1 Jan. 15, 2009

(51) Int. Cl.
H04N 19/895 (2014.01)
H04N 21/44 (2011.01)
H04N 5/44 (2011.01)
H04N 21/234 (2011.01)
H04N 21/43 (2011.01)
H04N 21/438 (2011.01)

(52) U.S. Cl.
CPC ....... *H04N 21/44016* (2013.01); *H04N 5/4401* (2013.01); *H04N 19/895* (2014.11); *H04N 21/23424* (2013.01); *H04N 21/4307* (2013.01); *H04N 21/4382* (2013.01); *H04N 21/4384* (2013.01); *H04N 21/44004* (2013.01)

(58) Field of Classification Search
USPC ................ 375/240; 725/115, 135, 240; 3/240
See application file for complete search history.

(56) References Cited

U.S. PATENT DOCUMENTS

| 6,031,584 | A | 2/2000 | Gray |
| 6,480,475 | B1 * | 11/2002 | Modlin et al. ................ 370/294 |
| 6,480,541 | B1 | 11/2002 | Girod |
| 6,782,497 | B2 * | 8/2004 | Yue ................................ 714/704 |
| 6,985,188 | B1 * | 1/2006 | Hurst, Jr. ...................... 348/553 |
| 7,075,986 | B2 | 7/2006 | Girod |
| 7,355,976 | B2 * | 4/2008 | Ho et al. ........................ 370/235 |

(Continued)

FOREIGN PATENT DOCUMENTS

| CN | 1469639 A | 1/2004 |
| CN | 1647499 A | 7/2005 |

(Continued)

OTHER PUBLICATIONS

International Search Report—PCT/US07/078922, International Search AUthority—European Patent Office—Jan. 12, 2009.

(Continued)

*Primary Examiner* — Dede Zecher
*Assistant Examiner* — Viral Lakhia
(74) *Attorney, Agent, or Firm* — Norton Rose Fulbright US LLP

(57) ABSTRACT

The disclosure relates to techniques for switching between channels of digital multimedia content. In particular, a decoding device decodes and renders to a display at least one frame of a segment of data prior to receiving the entire segment. In certain aspects, the decoding device may render one of the frames of the segment and freeze the rendered frame until the decoding device receives all of the frames of the segment. In other aspects, the decoding device may render frames of one or more segments at a reduced rendering rate until the receiving and rendering operations of decoding device are synchronized such that the rendering of the current segment occurs at substantially the same time as the receiving of the next segment. By rendering at least frame prior to receiving the entire segment the decoding device more quickly displays content to a user during a channel switching event.

52 Claims, 7 Drawing Sheets

(56) References Cited

U.S. PATENT DOCUMENTS

| | | | |
|---|---|---|---|
| 7,383,438 B2 * | 6/2008 | Fahrny et al. | 713/169 |
| 7,652,994 B2 * | 1/2010 | van Beek | 370/232 |
| 7,729,391 B2 * | 6/2010 | Miyaji et al. | 370/537 |
| 7,793,329 B2 * | 9/2010 | Joshi et al. | 725/120 |
| 8,169,345 B2 * | 5/2012 | Evans et al. | 341/61 |
| 2002/0013943 A1 * | 1/2002 | Haberman et al. | 725/39 |
| 2003/0126600 A1 * | 7/2003 | Heuvelman | 725/35 |
| 2004/0194134 A1 | 9/2004 | Gunatilake et al. | |
| 2004/0264924 A1 | 12/2004 | Campisano et al. | |
| 2005/0213668 A1 | 9/2005 | Iwabuchi et al. | |
| 2006/0039475 A1 * | 2/2006 | Liu et al. | 375/240.16 |
| 2006/0215016 A1 * | 9/2006 | Cohen et al. | 348/14.12 |
| 2007/0005795 A1 * | 1/2007 | Gonzalez | 709/232 |
| 2007/0006080 A1 * | 1/2007 | Finger et al. | 715/719 |
| 2007/0067480 A1 * | 3/2007 | Beek et al. | 709/231 |
| 2007/0081586 A1 * | 4/2007 | Raveendran et al. | 375/240.1 |
| 2007/0081587 A1 * | 4/2007 | Raveendran et al. | 375/240.1 |
| 2007/0081588 A1 * | 4/2007 | Raveendran et al. | 375/240.1 |
| 2007/0130393 A1 * | 6/2007 | Versteeg | 710/57 |
| 2007/0192812 A1 * | 8/2007 | Pickens et al. | 725/94 |
| 2007/0236599 A1 * | 10/2007 | van Beek | 348/419.1 |
| 2007/0268907 A1 * | 11/2007 | Paul et al. | 370/395.1 |
| 2009/0003462 A1 * | 1/2009 | Chen | 375/240.28 |
| 2009/0222873 A1 * | 9/2009 | Einarsson | 725/115 |
| 2010/0006080 A1 | 1/2010 | Chen | |
| 2010/0064316 A1 * | 3/2010 | Dai et al. | 725/38 |

FOREIGN PATENT DOCUMENTS

| | | |
|---|---|---|
| CN | 1738413 A | 2/2006 |
| EP | 1372338 | 12/2003 |
| EP | 1628488 A2 | 2/2006 |
| JP | 2001156681 A | 6/2001 |
| JP | 2002247465 A | 8/2002 |
| JP | 2004040789 A | 2/2004 |
| JP | 2005277701 A | 10/2005 |
| JP | 2006060813 A | 3/2006 |
| JP | 2008545335 A | 12/2008 |

OTHER PUBLICATIONS

Written Opinion—PCT/US07/078922, International Search Authority—European Patent Office—Jan. 12, 2009.

International Preliminary Report on Patenatability—PCT/US2007/078922, International Search Authority—European Patent Office—Sep. 29, 2009.

TIA-1099,"Forward Link Only Air Interface Specification for Terrestrial Mobile Multimedia Multicast" Aug. 2006.

Taiwan Search Report—TW096137090—TIPO—Feb. 17, 2012.

* cited by examiner

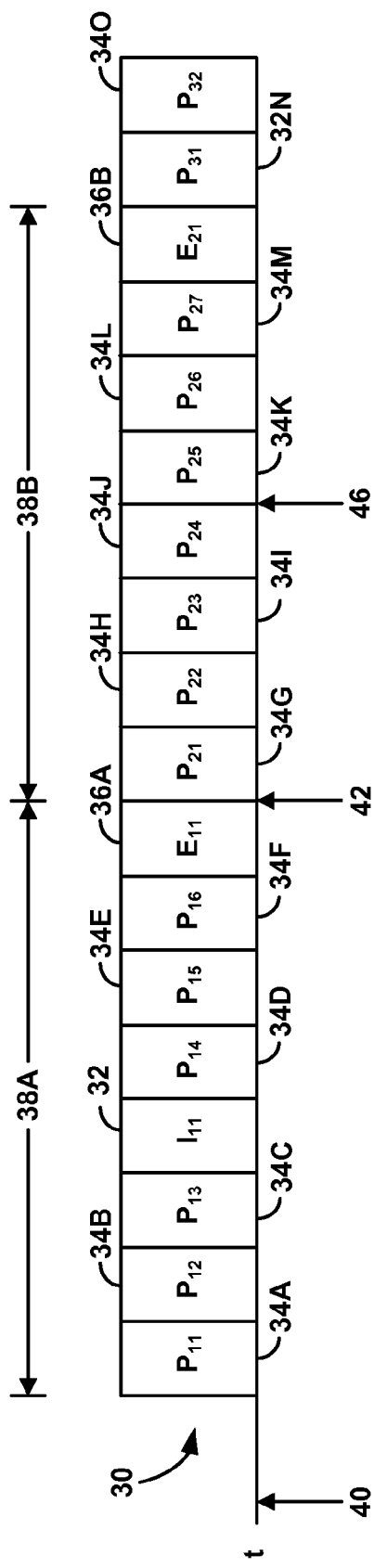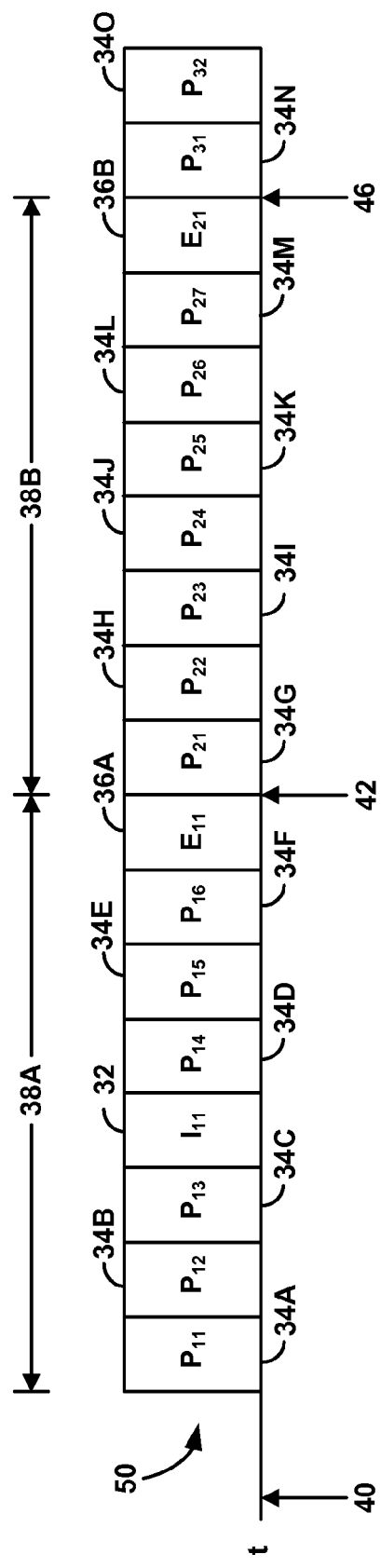

_US 9,426,522 B2_

EARLY RENDERING FOR FAST CHANNEL SWITCHING

TECHNICAL FIELD

The disclosure relates to digital multimedia and, more particularly, techniques for switching between channels of digital multimedia content.

BACKGROUND

Different techniques for broadcasting digital multimedia have been developed and optimized for reception by mobile wireless devices. Such techniques include Forward Link Only (FLO), Digital Multimedia Broadcasting (DMB), and Digital Video Broadcasting-Handheld (DVB-H). Digital multimedia broadcasting typically relies on one or more digital multimedia encoding standards, such as Moving Picture Experts Group (MPEG)-1, MPEG-2, MPEG-4, International Telecommunication Union (ITU) H.263, or ITU H.264. The ITU H.264 standard corresponds to MPEG-4, Part 10, entitled "Advanced Video Coding." These coding standards generally support transmission efficiency of multimedia sequences by encoding data in a compressed manner.

Several broadcasting techniques deliver content as a series of physical or logical channels, providing a content selection experience similar to a conventional television. Each physical or logical channel carries digital data that encodes audio and/or video streams, audio and/or video clips, or other informational content. To switch channels, the mobile device acquires digital data, e.g., in the form of one or more packets or frames, from a selected channel and decodes the data to present the content to the user. Prolonged delays in selecting and presenting a channel are undesirable, and undermine the "channel surfing" experience to which users are accustomed. Accordingly, reduction of channel switching time is a significant concern in broadcasting.

SUMMARY

In certain aspects of this disclosure, a method for processing video data comprises decoding at least one coded frame of a plurality of coded frames of at least a portion of a segment of the video data and rendering the at least one decoded frame to a display before a playback time associated with the at least one decoded frame in response to an event.

In certain aspects of this disclosure, an apparatus for processing video data comprises a decoding module that decodes at least one coded frame of a plurality of coded frames of at least a portion of a segment of the video data and a rendering module that renders the at least one decoded frame to a display before a playback time associated with the at least one decoded frame in response to an event.

In certain aspects of this disclosure, an apparatus for processing video data comprises means for decoding at least one coded frame of a plurality of coded frames of at least a portion of a segment of the video data and means for rendering the at least one decoded frame to a display before a playback time associated with the at least one decoded frame in response to an event.

In certain aspects of this disclosure, a computer-program product for processing multimedia data comprises a computer readable medium having instructions thereon. The instructions comprise code for decoding at least one coded frame of a plurality of coded frames of at least a portion of a segment of the video data and code for rendering the at least one decoded frame to a display before a playback time associated with the at least one decoded frame in response to an event.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a diagram illustrating a portion of an exemplary encoded multimedia sequence in which a decoding device renders a frame before an associated playback time and freezes the rendered frame.

FIG. 4 is a diagram illustrating a portion of another exemplary encoded multimedia sequence in which a decoding device renders one or more frames at a reduced rendering rate before associated playback times.

DETAILED DESCRIPTION

Figure 1:
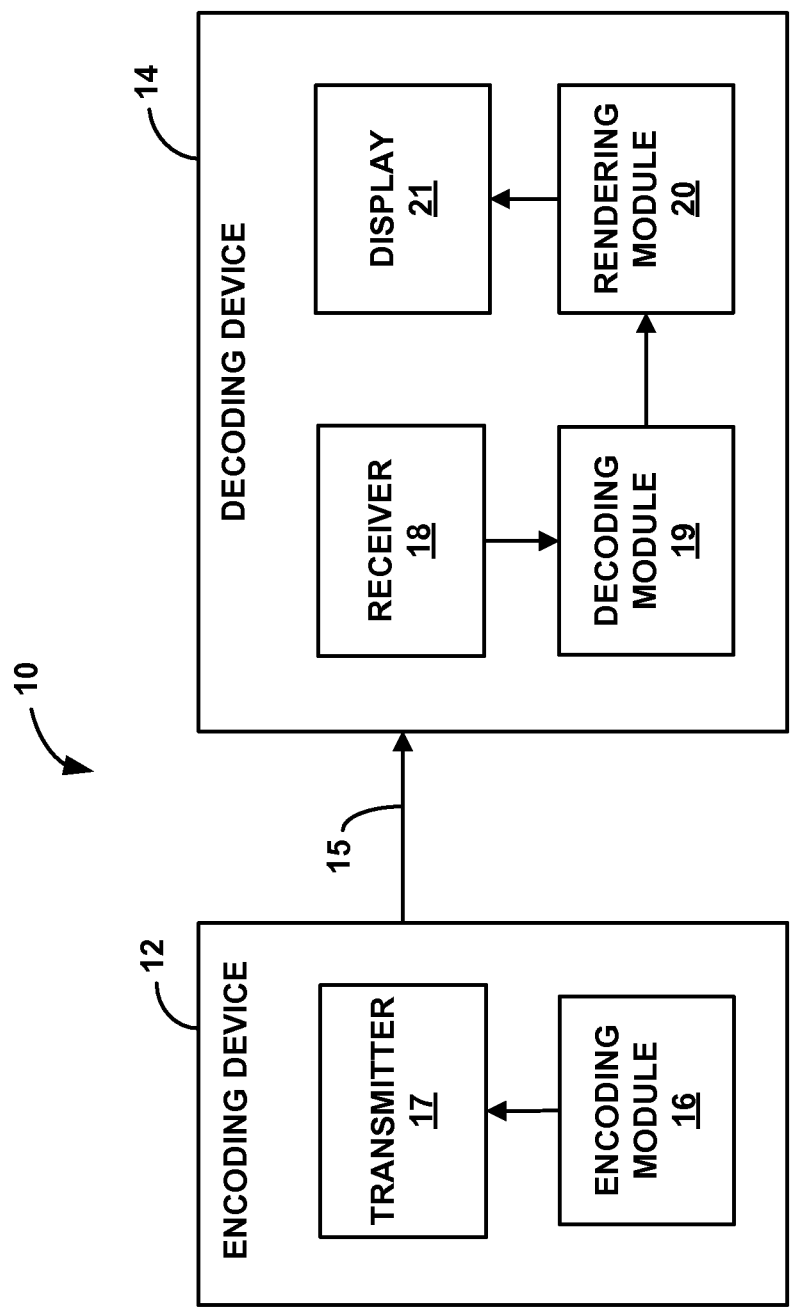
FIG. 1 is a block diagram illustrating a multimedia coding system that employs the channel switching techniques described herein.

The disclosure relates to digital multimedia communications and, more particularly, techniques for switching between channels of digital multimedia content. In some multimedia coding systems, a plurality of data units are grouped together into a segment of multimedia data, sometimes referred to as a "superframe." As used herein, the term "superframe" refers to a group of frames collected over a time period or window to form a segment of data. In a coding system that utilizes MediaFLO™ the superframe may comprise a one-second segment of data, which may nominally have 30 frames. A superframe may, however, include any number of frames. In some aspects, the data units may be grouped to form a segment of data related to a common error protection code. The techniques may also be utilized for encoding, combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time intervals. In either case, the data units (e.g., frames) of the segment of data correspond to a common error protection code. Note that, throughout this disclosure, a particular segment of multimedia data (e.g., similar to the concept of a superframe) refers to any chunk of multimedia data of a particular size and/or duration, where the particular size and/or duration is based at least in part on the error correction code used on the transport layer.

The techniques of this disclosure provide a channel switching scheme in which a decoding device renders decoded data of at least one of the frames of the superframe to a display before a playback time associated with the frame. Playback times are assigned to the frames during encoding. An encoding device assigns these playback times in such a way that if the frames are rendered by the decoding device at their respective playback times, the video will be played at the pace specified by the encoding device. By specifying the playback times of the frames the encoding device basically ensures smooth playback of the video even when transport errors occur during transmission of the encoded frames to the decoding device, assuming the transport error is corrected. The playback time typically is defined in the context a particular transport mechanism.

As will be described in more detail below, the playback time associated with the frame may be specified in the superframe, e.g., in the reference data. The decoding device may, for example, include a frame memory that stores decoded data of one of the frames of the superframe. A display driver may drive the display with the decoded data stored in the frame memory to present the decoded frame to a user before the playback time associated with the frame. Moreover, the decoding device may control a rate at which the frame memory is refreshed in order to synchronize the receiving and rendering operations of the decoding device such that rendering of the current superframe occurs at substantially the same instance in time as receiving of the subsequent superframe.

In certain aspects, the decoding device may render one of the frames of the superframe before the playback time associated with the frame and freeze the rendered frame. The decoding device may continue to freeze the rendered frame until receiving and rendering operations of the decoding device are synchronized such that rendering of the current superframe occurs at substantially the same time as receiving of the subsequent superframe. The point at which the receiving and rendering operations of the decoding device are synchronized may, for example, correspond to a point in time when the rendering time of a frame is equal to the playback time of the same frame. Alternatively, the decoding device may render a plurality of frames prior to each of their respective playback times. For example, the decoding device may render one or more of the frames of the superframe at a reduced rendering rate until the receiving and rendering operations of the decoding device are synchronized. To further enhance the early rendering capabilities of the decoding device, the decoding device may decode and render at least one of the frames of the superframe before an error correction unit associated with the superframe is received.

After the receiving and rendering operations of the decoding device are synchronized, the decoding device may begin to render the rest of the frames of the superframe at a normal rendering rate. In some aspects, the decoding device may additionally monitor for corruption in the frames. If the one of the frames includes corruption, e.g., due to a transport error, the decoding device may freeze the currently rendered frame. By rendering at least one of the frames of the superframe before the playback time associated with the frame the decoding device more quickly displays content to a user during the channel switching event.

FIG. 1 is a block diagram illustrating a multimedia coding system 10 that employs the channel switching techniques described herein. Multimedia coding system 10 includes an encoding device 12 and a decoding device 14 connected by a transmission channel 15. Encoding device 12 encodes one or more sequences of digital multimedia data and transmits the encoded sequences over transmission channel 15 to decoding device 14 for decoding and presentation to a user of decoding device 14. Transmission channel 15 may comprise any wired or wireless medium, or a combination thereof.

Encoding device 12 may form part of a broadcast network component used to broadcast one or more channels of multimedia data. As such, each of the encoded sequences may correspond to a channel of multimedia data. As an example, encoding device 12 may form part of a wireless base station, server, or any infrastructure node that is used to broadcast one or more channels of encoded multimedia data to wireless devices. In this case, encoding device 12 may transmit the encoded data to a plurality of wireless devices, such as decoding device 14. A single decoding device 14, however, is illustrated in FIG. 1 for simplicity.

Decoding device 14 may comprise a user device that receives the encoded multimedia data transmitted by encoding device 12 and decodes the video data for presentation to a user. By way of example, decoding device 14 may be implemented as part of a digital television, a wireless communication device, a gaming device, a portable digital assistant (PDA), a laptop computer or desktop computer, a digital music and video device, such as those sold under the trademark "iPod," or a radiotelephone such as cellular, satellite or terrestrial-based radiotelephone, or other wireless mobile terminal equipped for video and/or audio streaming, video telephony, or both. Decoding device 14 may be associated with a mobile or stationary device. In a broadcast application, encoding device 12 may transmit encoded multimedia data to multiple decoding devices 14 associated with multiple users.

In some aspects, for two-way communication applications, multimedia coding system 10 may support audio and/or video streaming or video telephony according to the Session Initiation Protocol (SIP), International Telecommunication Union Standardization Sector (ITU-T) H.323 standard, ITU-T H.324 standard, or other standards. For one-way or two-way communication, encoding device 12 may generate encoded multimedia data according to a video compression standard, such as Moving Picture Experts Group (MPEG)-2, MPEG-4, ITU-T H.263, or ITU-T H.264, which corresponds to MPEG-4, Part 10, Advanced Video Coding (AVC). Although not shown in FIG. 1, encoding device 12 and decoding device 14 may be integrated with an audio encoder and decoder, respectively, and include appropriate multiplexer-demultiplexer (MUX-DEMUX) modules, or other hardware, firmware, or software, to handle encoding of both audio and video in a common data sequence or separate data sequences. If applicable, MUX-DEMUX modules may conform to the ITU H.223 multiplexer protocol, or other protocols such as the user datagram protocol (UDP).

In some aspects, this disclosure contemplates application to Enhanced H.264 video coding for delivering real-time multimedia services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099, August 2006 (the "FLO Specification"). However, the channel switching techniques described in this disclosure are not limited to any particular type of broadcast, multicast, unicast or point-topoint system. Moreover, the techniques described herein are equally applicable to wired systems in which channel switching occurs.

As illustrated in FIG. 1, encoding device 12 includes an encoding module 16 and a transmitter 17. Encoding module 16 receives one or more input multimedia sequences that can include, in the case of video coding, one or more frames of data and selectively encodes the frames of the received multimedia sequences. Encoding module 16 receives the input multimedia sequences from one or more sources (not shown in FIG. 1). In some aspects, encoding module 16 may receive the input multimedia sequences from one or more video content providers, e.g., via satellite. As another example, encoding module 16 may receive the multimedia sequences from an image capture device integrated within encoding device 12 or coupled to encoding device 12. Alternatively, encoding module 16 may receive the multimedia sequences from a memory or archive within encoding device 12 or coupled to encoding device 12. The multimedia sequences may comprise live real-time or near real-time video and/or audio sequences to be coded and transmitted as a broadcast or on-demand, or may comprise pre-recorded and stored video and/or audio sequences to be coded and transmitted as a broadcast or on-demand. In some aspects, at least a portion of the multimedia sequences may be computer-generated, such as in the case of gaming.

In any case, encoding module 16 encodes and transmits a plurality of coded frames to decoding device 14 via transmitter 17. In some aspects, encoding device 12 may encode, combine and transmit frames received over a period of time and associated with a common error correction code. As described above, for example, encoding device 12 may encode frames of each of the input multimedia sequences received over the time period or window, combine the encoded frames of data to form a superframe or other segment of data, and transmit the superframe or other segment of data over transmission channel 15 via transmitter 17. The encoded superframe or other segment of data may also include at least one error correction code block to be used to correct any error introduced during transmission of the segment of data. Each of the frames of the segment of data may each be associated with the error correction code block. In other words, there may exist some relationship between the frames of the segment of data and the error correction unit such that a plurality of the frames are associated with the error correction code block.

Encoding module 16 may encode each of the frames of the superframe using one or more coding techniques. For example, encoding module 16 may encode one or more of the frames using intra-coding techniques. Frames encoded using intra-coding techniques are coded without reference to other frames, and are often referred to as intra ("I") frames. Encoding module 16 may also encode one or more of the frames using inter-coding techniques. Frames encoded using inter-coding techniques are coded with reference to one or more other frames. The inter-coded frames may include one or more predictive ("P") frames, bi-directional ("B") frames or a combination thereof. P frames are encoded with reference to at least one temporally prior frame while B frames are encoded with reference to at least one temporally future frame and at least one temporally prior frame.

Encoding module 16 may be further configured to partition a frame into a plurality of blocks and encode each of the blocks separately. As an example, encoding module 16 may partition the frame into a plurality of 16×16 blocks that include sixteen rows of pixels and sixteen columns of pixels. Some blocks, often referred to as "macroblocks," comprise a grouping of sub-partition blocks (referred to herein as "sub-blocks"). As an example, a 16×16 macroblock may comprise four 8×8 sub-blocks, or other sub-partition blocks. For example, the H.264 standard permits encoding of blocks with a variety of different sizes, e.g., 16×16, 16×8, 8×16, 8×8, 4×4, 8×4, and 4×8. Further, by extension, sub-blocks of any size may be included within a macroblock, e.g., 2×16, 16×2, 2×2, 4×16, 8×2 and so on.

Encoding module 16 may also encode and transmit one or more channel switch frames (CSFs) to enhance channel switching capabilities of decoding device 14. As used herein, the term "channel switch frame" or "CSF" refers to an intra-coded frame of data that includes at least a portion of the multimedia data of a corresponding inter-coded frame of data. In other words, the CSF may be viewed as a second coded version of at least a portion of the multimedia data of the corresponding inter-coded frame of data. In this manner, the CSF is co-located with the corresponding one of the inter-coded frames, and in some cases may be decoded in place of or along with the corresponding inter-coded frame.

Additionally, encoding module 16 may encode reference data that is used in decoding the coded frames of the segment. The reference data identifies a playback time that corresponds to each of the frames of the superframe. The playback times specify a time at which decoding device 14 should render the associated decoded frame. The playback time may be relative to particular event, such as a start of a superframe or other segment of data. For example, the playback time of a first frame of a first superframe may be relative to the start of the second superframe as will be described in more detail below. The reference data may also include data that identifies locations of inter- and intra-coded frames, the type of coding technique use to code the frame, block identifiers that identify blocks and type of coding used to code the blocks within a single frame, locations of reference frames for inter-coded frames and other information that may be useful or necessary in decoding the coded frames.

Encoding device 12 transmits the coded frames and the reference data of data via transmitter 17. Transmitter 17 may include appropriate modem and driver circuitry software and/or firmware to transmit encoded multimedia over transmission channel 15. For wireless applications, transmitter 17 includes RF circuitry to transmit wireless data carrying the encoded multimedia data.

Decoding device 14 receives the coded frames of data via a receiver 18. Like transmitter 17, receiver 18 may include appropriate modem and driver circuitry software and/or firmware to receive the coded frames of data over transmission channel 15, and may include RF circuitry to receive wireless data carrying the coded frames of data in wireless applications. In some aspects, encoding device 12 and decoding device 14 each may include reciprocal transmit and receive circuitry so that each may serve as both a transmit device and a receive device for encoded multimedia data and other information transmitted over transmission channel 15. In this case, both encoding device 12 and decoding device 14 may transmit and receive multimedia sequences and thus participate in two-way communications. In other words, the illustrated components of multimedia coding system 10 may be integrated as part of an encoder/decoder (CODEC).

Receiver 18 provides the coded frames to a decoding module 19. In certain aspects, receiver 18 may wait until an entire superframe is received before providing the data to decoding module 19 for decoding. In other words, receiver 18 receives an entire superframe, including the error correction unit, and then provides the entire superframe to decoding module 19 for decoding. In other aspects, receiver 18 receives at least a portion of the frames of a superframe and provides the frames of the superframe to a decoding module 19 as the superframe is received. For example, receiver 18 may provide frames of the superframe to the decoding module 19 as the individual frames or chunks of frames are received. In this case, receiver 18 provides the frames of the superframe to decoding module 19 before the error correction code block associated with the frames is received.

Decoding module 19 decodes the coded frames received from receiver 18 and provides the decoded multimedia data to a rendering module 20. Rendering module 20 renders the decoded multimedia data for display to a user via a display 21. As described in detail herein, rendering module 20 may include a frame memory that stores decoded data of at one of the frames of the superframe and a display driver that drives display 21 to present the decoded frame to a user. Rendering module 20 may control a rate at which the frame memory is refreshed with decoded data of subsequent frames in order to implement the techniques of this disclosure. Display 21 may be integrated within decoding device 14 as shown in FIG. 1. Alternatively, display 21 may be coupled to decoding device 14. Display 21 may comprise a liquid crystal display (LCD), a light emitting diode (LED), an organic light emitting diode (OLED), a cathode ray tube (CRT) or other type of display.

During regular operation, rendering module 20 may render the decoded multimedia data of the frames at the playback time associated with the frames. In other words, rendering module 20 renders the decoded multimedia data of the frames in accordance with the playback times specified in the reference data. In some cases, for example, rendering module 20 may render the frames of a current superframe at substantially the same time receiver 18 receives frames of a subsequent superframe. Thus, rendering module 20 may refresh the frame memory with the decoded data of the frames of the current superframe at the same rate as receiver 18 receives the frames of the subsequent superframe. Rendering the current superframe at substantially the same time as receiving the subsequent superframe allows decoding module 19 to correct any corruption that is a result of error introduced during transmission or loss of data during transmission across a network before the decoded data is rendered to display 21 for the user. For example, each superframe may include an error correction unit at the end of the superframe that is used to correct any transport errors in the superframe. If the data is rendered to display 21 before the error correction unit is received there is a higher probability of corruption in the rendered video.

In response to an event, such as a channel switch request, decoding device 14 decodes and renders at least one of the frames of a superframe of the new channel prior to the playback time associated with the at least one frame. In this manner, decoding device 14 can display content of the new channel to the user more quickly. The content displayed to the user may be displayed as a still frame or a series of still frames, or be displayed at a reduced rendering rate. However, display of a still frame or reduced rendering rate may provide for a more pleasurable viewing experience during the channel switching event than displaying nothing or the previously watched channel content to the user.

In certain aspects, rendering module 20 may render one of the frames of the superframe to display 21 until the receiving and rendering operations of decoding device 14 are synchronized such that rendering of the current superframe occurs at substantially the same time as receiving of the subsequent superframe. As described above, the point in time at which the receiving and rendering operations of decoding device 14 are synchronized may correspond with the point in time when the rendering time of a frame is equal to the playback time of the same frame. In other words, rendering module 20 may freeze the rendered frame on display 21 until the playback time associated with the rendered frame that is frozen on display 21. In one example, rendering module 20 may freeze the rendered frame on display 21 by not refreshing the decoded data of the frame memory. After the receiving and rendering operations are synchronized, rendering module 20 may begin to render the data of the remaining frames of the superframes at the associated playback times specified in the reference data.

In other aspects, rendering module 20 may render a plurality of frames prior to their corresponding rendering rates. For example, rendering module 20 may render frames of one or more superframes at a reduced rendering rate until the receiving and rendering operations of decoding device 14 are synchronized, i.e., until the rendering time of a frame is equal to the associated playback time of the frame being rendered. In this case, rendering module 20 may refresh the decoded data of the frame memory at a refresh rate that is slower than the receiving and/or decoding rates. In this manner, more than one frame is rendered prior to its associated playback time. The amount of time that elapses before the receiving and rendering operations of decoding device 14 are synchronized depends on the reduced rate at which rendering module 20 renders the frames. After the receiving and rendering functions of decoding device 14 are synchronized such that rendering of the current superframe occurs at substantially the same time as receiving of the subsequent superframe, rendering module 20 begins to render frames of the subsequent superframes at their associated playback times specified in the reference data. In certain aspects, rendering module 20 may incrementally increase the rendering frame rate until the receiving and rendering operations are synchronized.

In another example, rendering module 20 may render frames of one or more superframes prior to their associated playback times, but do so at a normal rendering rate. In this case, the receiving and rendering operations of decoding device 14 may not become synchronized until data of one of the subsequent frames is not received by decoding device 19, and the current frame is frozen as described in detail below.

When rendering the frames at an original or reduced rendering rate, decoding device 14 may monitor for data corruption in the coded and/or decoded frames. Corruption in the frames may result from errors introduced during transmission or loss of data during transmission across a network. In response to detecting corruption in a subsequent frame of the superframe, receiver 18 may wait for an error correction unit associated with the superframe to be received and attempt to correct the error in the frame using the associated error correction unit. Receive 18, therefore, does not provide decoding module 19 with the frame until after the error is corrected using the error correction unit associated with the frame. Rendering module 20 may stop rendering the frames of the superframe because there is no frame data to render. Instead, rendering module 20 may freeze the currently rendered frame instead of rendering the subsequent frame, which includes the error.

Rendering module 20 may be configured to initially render a first random access point (RAP) within the superframe for display. The RAP may comprise, for example, either an I frame or a CSF frame. Alternatively, rendering module 20 may render the first frame of the superframe, regardless of the coding technique used to code the frame. In other words, rendering module 20 renders the first decoded frame of the superframe, regardless of whether the first frame is an inter- or intra-coded frame.

The foregoing techniques may be implemented individually, or two or more of such techniques, or all of such techniques, may be implemented together in encoding device 12 and/or decoding device 14. The components in encoding device 12 and decoding device 14 are exemplary of those applicable to implement the techniques described herein. Encoding device 12 and decoding device 14, however, may include many other components, if desired, as well as fewer components that combine the functionality of one or more of the modules described above. In addition, encoding device 12 and decoding device 14 may include appropriate modulation, demodulation, frequency conversion, filtering, and amplifier components for transmission and reception of encoded video, including radio frequency (RF) wireless components and antennas, as applicable. For ease of illustration, however, such components are not shown in FIG. 1.

The components in encoding device 12 and decoding device 14 may be implemented as one or more processors, digital signal processors, application specific integrated circuits (ASICs), field programmable gate arrays (FPGAs), discrete logic, software, hardware, firmware or any combinations thereof. Depiction of different features as modules is intended to highlight different functional aspects of encoding device 12 and decoding device 14 and does not necessarily imply that such modules must be realized by separate hardware or software components. Rather, functionality associated with one or more modules may be integrated within common or separate hardware or software components. Thus, the disclosure should not be limited to the example of encoding device 12 and decoding device 14.

Figure 2:
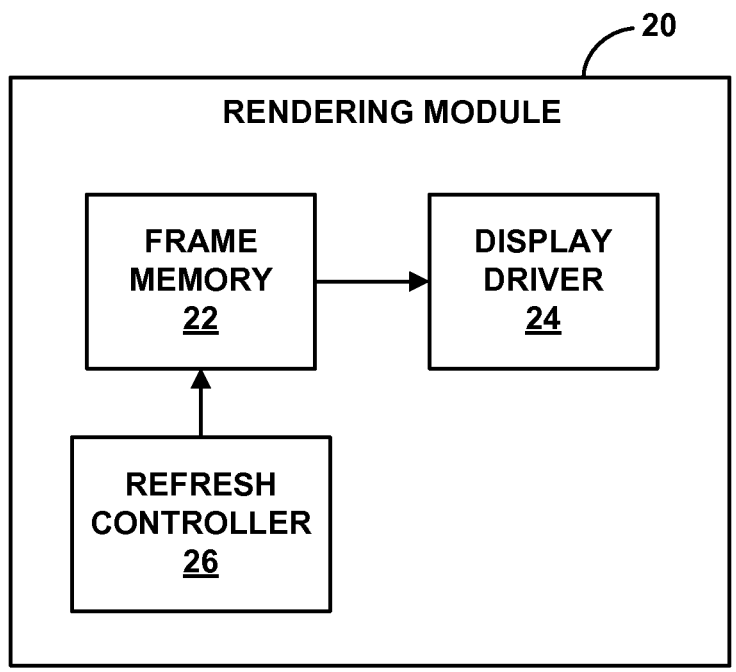
FIG. 2 is a block diagram illustrating an exemplary rendering module in further detail.

FIG. 2 is a block diagram illustrating an exemplary rendering module 20 in further detail. Rendering module 20 includes a frame memory 22, a display driver 24 and a refresh controller 26. Frame memory 22 stores decoded data of at least one frame of the superframe. Frame memory 22 may receive the decoded data from decoding module 19 (FIG. 1). Display driver 24 drives display 21 (FIG. 1) to present the decoded data stored in frame memory 22 to a user. Refresh controller 26 controls a rate at which rendering module 20 refreshes frame memory 22 with new decoded frame data from decoding module 19. As described above with respect to FIG. 1, frame memory 22, display driver 24 and refresh controller 26 operate together to render at least one of the frames of a superframe of the new channel prior to a playback time associated with the at least one frame in response to a channel switch request.

In certain aspects, rendering module 20 may render one of the frames of the superframe to display 21 prior to a playback time associated with the frame and freeze the rendered frame. In particular, display driver 24 may drive display 21 with the decoded data of frame memory 22 prior to the associated playback time specified in the reference data. Refresh controller 26 does not refresh the decoded data of frame memory 22 until the playback time associated with the frame. In other words, refresh controller does not refresh the decoded data of frame memory 22 until the receiving and rendering operations of decoding device 14 are synchronized such that rendering of the current superframe occurs at substantially the same time as receiving of the subsequent superframe.

Refresh controller 26 may be configured to not refresh the decoded frame data of frame memory 22 for a particular period of time. For example, refresh controller 26 may be configured to not refresh the decoded frame data of frame memory 22 until the playback time associated with the subsequent frame of the superframe. Thus, rendering module 20 may be viewed as freezing the rendered frame on display 21 until receiving and rendering operations of decoding device 14 are synchronized. In other words, rendering module 20 maintains the presently decoded frame in frame memory 22 until receiving and rendering operations of decoding device 14 are synchronized. After the receiving and rendering operations of decoding device 14 are synchronized, e.g., at the playback time associated with the currently rendered/frozen frame, refresh controller 26 begins to refresh frame memory 22 with the data of subsequent decoded frames at the playback time associated with each of the subsequent frames of the superframe.

In other aspects, rendering module 20 may render frames of one or more superframes prior to their associated playback times. In one example, rendering module 20 may render the one or more frames at a reduced rate until the receiving and rendering operations of decoding device 14 are synchronized. In other words, rendering module 20 may render the one or more frames at a reduced rate until the rendering time of one of the frames is equal to the associated playback time of the same frame. This may, for example, be at the playback time associated with the last of the one or more frames rendered at the reduced frame rate. In this case, refresh controller 26 refreshes the decoded data of frame memory 22 at a refresh rate that is slower than the normal rendering rate. In this manner, more than one frame is rendered prior to its associated playback time until the receiving and rendering operation of decoding device 14 are synchronized. In one example, refresh controller 26 refreshes the decoded data of frame memory 22 at a rate that is half of the normal rendering rates. At this reduced refresh rate, the receiving and rendering operations of decoding device 14 are synchronized after rendering of one superframe. However, the amount of time or number of superframes that are rendered prior to their associated playback times depends on the reduced refresh rate at which refresh controller 26 refreshes the decoded data of frame memory 22. In certain aspects, refresh controller may dynamically increase and/or decrease the refresh rate to assist in the synchronization.

In another example, rendering module 20 may render frames of one or more superframes prior to their associated playback times, but do so at a normal rendering rate. In other words, refresh controller 26 refreshes the decoded data of frame memory 22 at a normal refresh rate. The receiving and rendering operations of decoding device 14 may not become synchronized until data of one of the subsequent frames is not received by decoding device 19, and the current frame is frozen as described in detail below.

When rendering more than one frame prior to their associated playback times, receiver 18 may monitor for data corruption in the coded and/or decoded frames. Corruption in the frames may result from errors introduced during transmission or loss of data during transmission across a network. In response to detecting corruption in a subsequent frame of the superframe, refresh controller 26 may not have data of the subsequent frame to use in refreshing the decoded data of frame memory 22. Thus, refresh controller 26 may maintain the data of the previous frame in frame memory 22 to freeze the currently rendered frame instead of rendering the subsequent frame.

The components in rendering module 20 are exemplary of those applicable to implement the techniques described herein. Rendering module 20, however, may include many other components, if desired, as well as fewer components that combine the functionality of one or more of the modules described above. Depiction of different features as modules/components is intended to highlight different functional aspects of rendering module 20 and does not necessarily imply that such modules must be realized by separate hardware or software components. Rather, functionality associated with one or more modules/components may be integrated within common or separate hardware or software components.

FIG. 3 is a diagram illustrating a portion of an exemplary encoded multimedia sequence 30. Encoded sequence 30 may correspond to a channel of multimedia data. As an example, encoded sequence 30 may correspond to ESPN, FOX, MSNBC or another television channel. Although the example illustrated in FIG. 3 shows an encoded sequence for only one channel, the techniques of this disclosure are applicable to any number of encoded sequences for any number of channels.

Encoded sequence 30 includes a plurality of coded frames. The coded frames represent compressed versions of respective input frames encoded by various inter-coding or intra-coding techniques. Encoded sequence 30 includes an intra-coded frame 32 (labeled as "$I_{11}$" in FIG. 3), P frames 34A-34O (collectively, "P frames 34" and labeled as "$P_{xx}$") and error correction units 36A and 36B (collectively, "error correction units 36" and labeled as $E_{xx}$).

I frame 32 is an intra-coded version of at least a portion of a respective input frame. In other words, I frame 32 is coded without reference to other frames, and is therefore independently decodable. I frame 32 may, for example, be an intra-coded frame at the start of a video sequence or at a scene change. Thus, the location of I frame 32 may be anywhere within superframe 38A. Alternatively, the intra-coded frame may comprise a CSF (not shown in FIG. 3).

Inter-coded frames 34 are inter-coded versions of their respective input frames that reference one or more other frames. In the example illustrated in FIG. 3, inter-coded frames 34 comprise P frames. In other aspects, however, inter-coded frames may comprise B frames or a combination of P frames and B frames. Error correction units 36 include information used by decoding device 14 for error correction. For example, error correction units 36 may include a Reed-Solomon parity check code to be used by decoding device 14 for correcting transmission errors.

As described above, the coded frames of encoded sequence 30 may be grouped together into a segment of multimedia data, e.g., a superframe. The portion of encoded sequence 30 shown in the example illustrated in FIG. 3 includes two full superframes 38A and 38B (collectively, "superframes 38") as well as a portion of a third superframe. Superframe 38A includes I frame 32, P frames 34A-34F and error correction unit 36A. I frame 32 and P frames 34A-34F may form one or more data blocks of superframe 38A and error correction unit 36A may form a protection block. Thus, I frame 32 and P frames 34A-34F may be viewed as being related to a common error protection scheme. Superframe 38B includes P frames 34G-34M and error correction unit 36B. P frames 34G-34M may form one or more data blocks of superframe 38B and error correction unit 36B may form a protection block. Thus, P frames 34G-34M may be viewed as being related to a common error protection scheme. Also shown are the first two frames of the third superframe, i.e., P frame 34N and 34O. Although each of superframes 38 shown in FIG. 3 includes seven frames and their corresponding error correction unit, superframes 38 may include any number of frames. In one aspect, for example, each of superframes 38 may include thirty frames. Moreover, each of superframes 38 may include different arrangement and types of frames. For example, I frame 32 may be positioned elsewhere within superframe 38A. Additionally, superframes may include more than one error correction unit 36.

Decoding device 14 detects an event, such as a channel switch request. The channel switch request may be received from the user via a user interface. In one example, the user may actuate a channel switch button located on decoding device 14 to generate the channel switch request. In the example illustrated in FIG. 3, decoding device 14 receives the channel switch request at arrow 40. After receiving the channel switch request, decoding device 14 may wait until the start of the next superframe, superframe 38B in the example illustrated in FIG. 3, before rendering any frames. Alternatively, decoding device 14 may not wait for superframe 38B, but instead, immediately begin to decode and render the first frame following the channel switch request.

In the example illustrated in FIG. 3, decoding device 14 receives the superframes 38 from receiver 18 (FIG. 1) after receiver 18 receives an entire superframe including the error correction code block. Thus, decoding device 14 waits until the start of the next superframe, superframe 38B before rendering any frames. Decoding device 14 decodes and renders one of the frames of superframe 38A for display to the user prior to a playback time associated with the frame. In the example illustrated in FIG. 3, decoding device 14 begins rendering frames at arrow 42. Conventionally, decoding device 14 would begin rendering the frames at their respective playback times specified in the reference data, which are typically measured relative to second superframe 38B. However, rendering module 20 renders I frame 32 at arrow 42 in accordance with the techniques of this disclosure to more quickly present content of the new channel to the user. In the illustrated example, I frame 32 would conventionally be decoded at its respective playback time represented by arrow 46.

After rendering I frame 32 to display 21, decoding device 14 freezes rendered I frame 32 until the playback time associated with I frame 32, i.e., at arrow 46. At this point, the receiving and rendering operations of decoding device 14 are synchronized, and rendering module 20 begins to render the data of the remaining decoded frames of superframe 38A at the associated playback times specified in the reference data. At this point, while rendering module 20 renders the frames of superframe 38A to the user, receiver 18 receives the frames of superframe 38B. For example, as rendering module 20 renders P frame $P_{14}$, receiver 18 receives frame P25.

Rendering I frame 32 prior to its associated playback time in response to a channel switch request allows decoding device 14 to display content of the new channel to the user more quickly. Yet, freezing the rendered I frame 32 and waiting for the receiving and rendering operations to become synchronized allows decoding device 14 to correct corruption in the frames before the rest of the decoded data is rendered to display 21 for presentation to the user. Thus, although the content displayed to the user may be displayed as a still frame, it provides a more pleasurable viewing experience than displaying a nothing or the content of the previously viewed channel during the channel switching event.

In the example described above, decoding device 14 renders I frame 32 instead of any of the previous frames of superframe 38A. In this manner, decoding device 14 renders a RAP within superframe 38A. Alternatively, decoding device 14 may render other frames within superframe 38A, e.g., P frame 34C, prior to its corresponding playback time. Rendered P frame 34C may, however, include artifacts caused by a mixture of content from the new channel and old channel.

Encoded sequence 30 is illustrated for exemplary purposes only. Various locations of I frame 32 within encoded sequences 30 may be used. Moreover, encoded sequence 30 may include different arrangements and types frames. For example, encoded sequences may include different arrangements of CSF frames, I frames, P frames and B frames.

FIG. 4 is a diagram illustrating a portion of another exemplary encoded multimedia sequence 50. Encoded multimedia sequence 50 conforms substantially to encoded multimedia sequence 30 of FIG. 3, except that instead of rendering a single decoded frame of data prior to the associated playback time and freezing the rendered frame, decoding device 14 renders a plurality of frames of one or more superframes 38 prior to their associated playback times.

In particular, decoding device 14 begins to render one or more frames of superframe 38A prior to their associated playback times in response to a channel switch request. In certain aspects, decoding device 14 may begin rendering a RAP of superframe 38A, such as I frame 32. As described above with respect to FIG. 3, decoding device 14 may render I frame 32 at arrow 42. Instead of freezing rendered I frame 32, however, decoding device 14 may continue to render subsequent frames of superframe 38A.

In one example, decoding device 14 may render the one or more frames at a reduced rendering rate until the receiving and rendering operations of decoding device 14 are synchronized such that rendering of the current superframe occurs at substantially the same time as receiving of the subsequent superframe. For example, decoding device 14 may begin, at arrow 42, to render the frames of superframe 38A at a rendering frame rate that is half of the normal rendering rate. At this reduced rendering frame rate, the receiving and rendering operations of decoding device 14 are synchronized at arrow 46. In some cases, it may be preferred that the synchronization occur at the end of a superframe. In this manner, a plurality of frames of superframe 38A are rendered prior to their associated playback times. However, the amount of time or number of superframes that are rendered before the receiving and rendering operations of decoding device 14 are synchronized depends on the reduced rendering rate at which rendering module 20 renders the frames. In certain aspects, decoding device 14 may incrementally increase the rendering rate until the receiving and rendering operations are synchronized such that rendering of the current superframe occurs at substantially the same time as receiving of the subsequent superframe.

After the receiving and rendering functions of decoding device 14 are synchronized, rendering module 20 begins to render frames of the subsequent superframes at their respective playback times specified in the reference data. Thus, decoding device 14 renders P frame 34G at the associated playback time represented by arrow 46. Moreover, the rest of the frames of superframe 38B are rendered at their respective playback times specified in the reference data of superframe 38B. Rendering the frames of superframe 38A at a reduced rate allows decoding device 14 to render content of the new channel to display 21 for presentation to the user more quickly.

In another example, rendering module 20 may render frames of one or more superframes prior to their associated playback times, but do so at a normal rendering rate. For example, decoding device 14 may begin, at arrow 42, to render the frames of superframe 38A at a normal rendering rate. In this case, the receiving and rendering operations of decoding device 14 are not synchronized at arrow 46. In fact, the receiving and rendering operations of decoding device 14 may not become synchronized until data of one of the subsequent frames is not available for rendering. When no data is available for one of the subsequent frames, rendering module 20 may freeze the currently rendered frame until the receiving and rendering operations are synchronized, as described in detail below.

Figure 5:
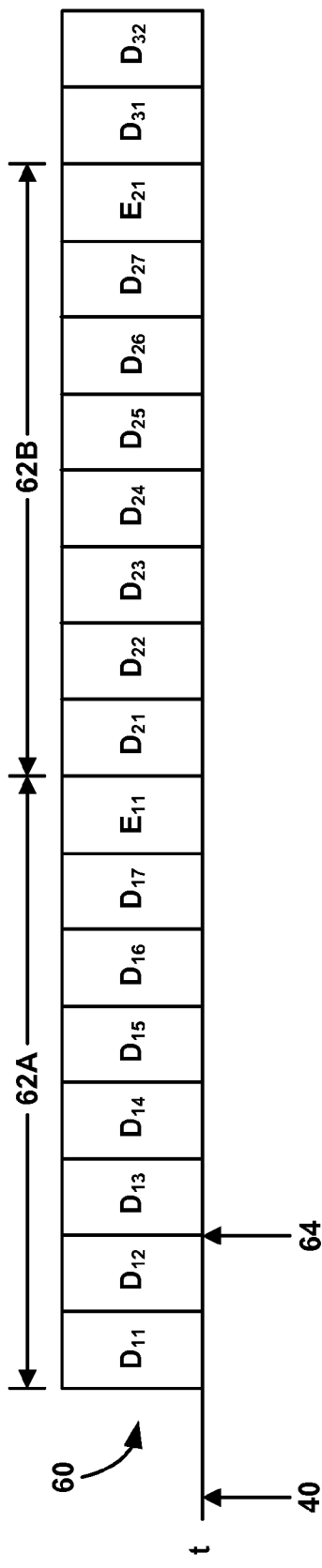
FIG. 5 is a diagram illustrating a portion of another exemplary encoded multimedia sequence in which one or more data units are provided to a decoding module prior to receiving an associated error correction unit.

FIG. 5 is a diagram illustrating a portion of another exemplary encoded multimedia sequence 60. Encoded multimedia sequence 60 includes a plurality of data units (labeled "$D_{xx}$") and error correction units (labeled "$E_{xx}$"). The data units and error correction units are grouped to form code blocks 62A and 62B (collectively, "segments of data 62"). In particular, data units $D_{11}$-$D_{17}$ and error correction unit $E_{11}$ are grouped to form code block 62A. Likewise, data units $D_{21}$-$D_{27}$ and error correction unit $E_{22}$ are grouped to form code block 62B. In this manner, code blocks 62 represent a group of data units that correspond to a common error correction code.

In some aspects, there may be a 1:1 correspondence between code blocks 62 and superframes, e.g., superframes 38 of FIGS. 3 and 4. In other words, each of code blocks 62 may correspond to a respective superframe. Alternatively, two or more code blocks may be included within a single superframe. Likewise, there may also be a 1:1 correspondence between data units and frames of data. In other words, each of the data units may correspond to a single frame of a picture sequence. Alternatively, a data unit may include more or less data than a single frame.

In some embodiments, receiver 18 may wait to receive an entire segment of data, including the associated error correction unit $E_{xx}$, and provide the entire segment of data to decoding module 19. However, to further enhance the early rendering capabilities described above, receiver 18 may provide at least one of the data units of segment of data 62A to decoding module 19 before an error correction unit $E_{11}$ is received, e.g., at arrow 64. In other words, receiver 18 receives at least a portion of the data units of segment of data 62A and provides the data units to decoding module 19 as segment of data 62A is received. For example, receiver 18 may provide data units of segment of data 62A to decoding module 19 as the individual data units are received. Providing one or more data units to decoding module 19 before an entire segment of data 62A is received allows decoding device 14 to more quickly render content of the new channel to a display.

However, when one of the data units of segment of data 62A includes a transmission error, receiver 18 stops giving the data units to decoding module 19 before error correction unit $E_{11}$ is received. Instead, receiver 18 waits for error correction unit $E_{11}$ to be received and attempts to correct the transmission error of the frame using error correction unit $E_{11}$. Once the error is corrected, receiver 18 continues to provide the frames to decoding module 19.

Figure 6:
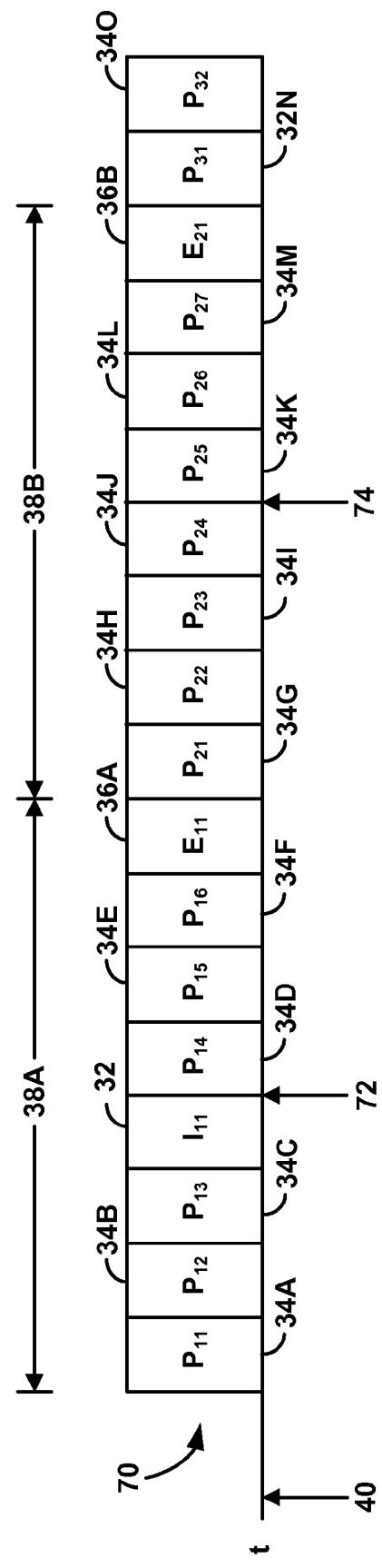
FIG. 6 is a diagram illustrating a portion of another exemplary encoded multimedia sequence in which a decoding device renders a frame before an associated playback time and freezes the rendered frame.

FIG. 6 is a diagram illustrating a portion of an exemplary encoded multimedia sequence 70. Encoded sequence 70 conforms substantially with encoded sequence 30 of FIG. 3. As will be described in detail below, decoding device 14 may combine the early rendering techniques described above with respect to FIG. 3 with the early delivery of data units from receiver 18 to decoding module 19 as described with respect to FIG. 5 to further enhance the early rendering capabilities of decoder device 14.

As described above, receiver 18 may provide at least one of the data units of the segment of data to decoding module 19 before an error correction unit 36 of the segment of data is received. Providing the data units to decoding module 19 prior to receiving the error correction unit 36 associated with the frame allows decoding device 14 to render I frame 32 even further before the playback time associated with the frame than the techniques described above with respect to FIG. 3. More specifically, decoding device 14 begins rendering frames at arrow 72. Thus, decoding device 14 decodes and renders I frame 32 before receiving the entire superframe 38A. After rendering I frame 32 to display 21, decoding device 14 freezes rendered I frame 32 until the receiving and rendering operations of decoding device 14 are synchronized such that rendering of superframe 38A occurs at substantially the same time as receiving of subsequent superframe 38B, i.e., at arrow 74. At this point, the receiving and rendering operations are synchronized and rendering module 20 begins to render the data of the remaining decoded frames of superframe 38A at the associated playback times specified in the reference data. Rendering the data before receiving the associated error correction unit 36 may, however, result in rendered I frame 32 having visual artifacts or corruption due to transmission errors that decoding device 14 is unable to correct because it has not yet received the associated error correction unit 36.

Figure 7:
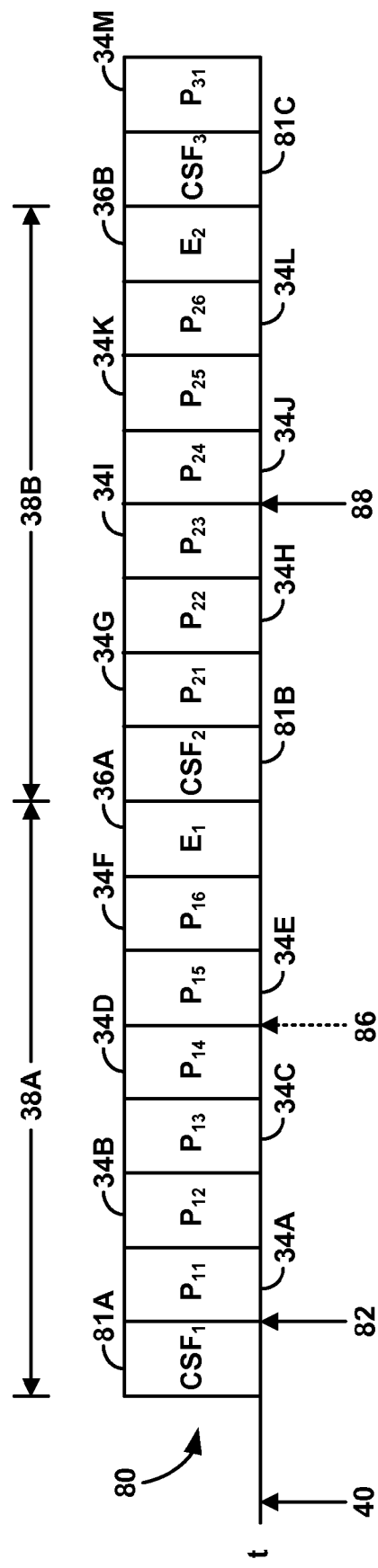
FIG. 7 is a diagram illustrating a portion of another exemplary encoded multimedia sequence in which a decoding device renders one or more frames at an original or reduced rendering rate before associated playback times.

FIG. 7 is a diagram illustrating a portion of another exemplary encoded multimedia sequence 80. Encoded sequence 80 conforms substantially to encoded sequence 70 of FIG. 6, except that encoded sequence 80 includes CSFs 81A-81C (collectively, "CSFs 81" and labeled as "CSFX" in FIG. 7). In the example shown in FIG. 7, each of superframes 38 includes a corresponding CSF 81 that is located as the first frame in the respective superframe 38. However, various methods of choosing a location of CSF frames 81 within encoded sequences 80 may be used.

CSFs 81 are intra-coded versions of at least a portion of a respective input frame. In other words, CSFs 81 are coded without reference to other frames, and are therefore independently decodable. In certain aspects, CSFs 81 may be encoded at a lower quality than other frames of encoded sequence 80. Although not shown in FIG. 7, CSFs 81 may be temporally co-located with a corresponding one of inter-coded frames 34 in the sense that the temporal position of CSFs 81 within a video sequence corresponds to the temporal position of the corresponding inter-coded frame 34 in the same video sequence. In this case, CSFs 81 may be viewed as a second, intra-coded version of at least a portion of the multimedia data coded in corresponding inter-coded frame 34.

When no channel switch is requested, CSFs 81 may be dropped and decoding device decodes and renders the one of inter-coded frames 34 associated with the CSF frame 81. In response to a channel switch request, however, decoding device 14 decodes and renders CSF 81A of superframe 38A, i.e., at arrow 82. In accordance with the techniques of this disclosure, decoding device 14 renders CSF 81A prior to its associated playback time. The associated playback time of CSF 81A may, in some cases, be the same playback time associated with the corresponding one of inter-coded frames 34 (e.g., P frame 34A).

In some cases, as described above, decoding device 14 may freeze rendered CSF frame 81A. Alternatively, decoding device 14 may render one or more subsequent frames prior to their associated playback times. In one example, decoding device 14 may render frames of superframe 38A at a reduced rendering rate until the receiving and rendering operations of decoding device 14 are synchronized. In other words, decoding device 14 may render frames of superframe 38A at a reduced rendering rate until the rendering time of one of the frames is equal to the playback time associated with that frame. In this manner, a plurality of frames of superframes 38A is rendered prior to their associated playback times. However, the amount of time or number of superframes that are rendered before the receiving and rendering operations of decoding device 14 are synchronized depends on the reduced rendering rate at which rendering module 20 renders the frames. In certain aspects, decoding device 14 may incrementally increase the rendering rate until the receiving and rendering operations are synchronized such that rendering of the current superframe occurs at substantially the same time as receiving of the subsequent superframe.

In another example, rendering module 20 may render frames of superframe 38A prior to their associated playback times, but do so at a normal rendering rate. For example, decoding device 14 may begin, at arrow 82, to render the frames of superframe 38A at the normal rendering rate. When rendering the frames at the normal rendering rate, the receiving and rendering operations of decoding device 14 are not synchronized at arrow 46. In fact, the receiving and rendering operations of decoding device 14 may not become synchronized until data of one of the subsequent frames is not available for rendering and a rendered frame is frozen, as described below.

Rendering module 20 may not have data of a subsequent frame of superframe 38A due to a transmission error. As described above, the corruption may be the result of errors introduced during transmission or loss of data during transmission across a network. In the illustrated example, rendering module 20 may not have data for P frame 34D due to a corruption error detected by receiver 18. As a result, rendering module 20 freezes the currently rendered frame, i.e., P frame 34C, at the location indicated by arrow 86. Decoding device 14 may continue freeze P frame 34C until the playback time associated with P frame 34C, i.e., until the receiving and rendering operations of decoding device 14 are synchronized at arrow 88.

Figure 8:
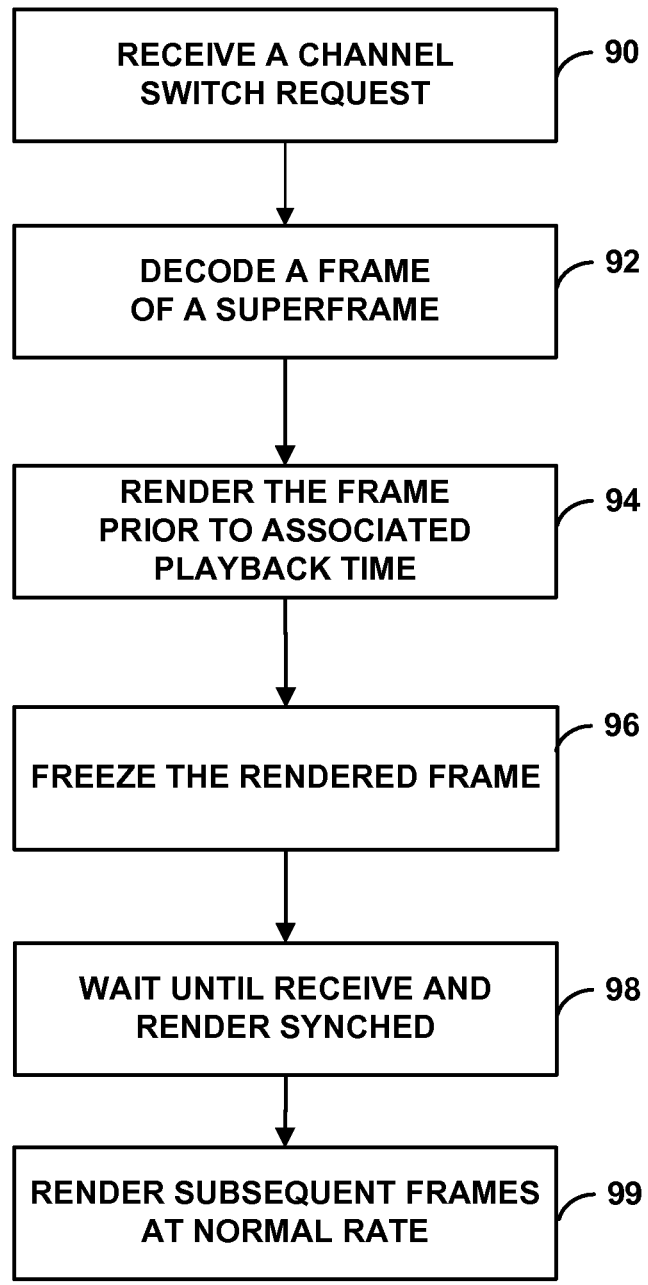
FIG. 8 is a flow diagram illustrating exemplary operation of a decoding device rendering a frame of a superframe and freezing the rendered frame until the entire superframe is received.

FIG. 8 is a flow diagram illustrating exemplary operation of a decoding device, such as decoding device 14 of FIG. 1, rendering a frame of a superframe and freezing the rendered frame until the entire superframe is received. Initially, decoding module 19 receives a channel switch request (90). The channel switch request may be received from the user via a user interface, such as a channel control button.

Decoding module 19 decodes a frame of a superframe (92). In some cases, decoding module 19 waits until the first RAP of the superframe, e.g., a CSF or I frame. Decoding module 19 may also wait until receiving a frame of the first full superframe after the channel switch request before decoding one of the frames of the superframe. In other words, if the channel switch request occurs during the middle of a superframe of the new channel, decoding module 19 may wait to decode a frame of the subsequent superframe. Alternatively, decoding device 14 may not wait for the next superframe 38, but instead, immediately begin to decode the first RAP frame following the channel switch request.

Rendering module 20 renders the decoded frame of the superframe for display to the user prior to an associated playback time (94). In particular, rendering module 20 drives display 21 to present decoded data of frame that is stored in a frame memory 22 prior to the associated playback time specified in the reference data of the superframe. Rendering module 20 freezes the rendered frame on display 21 (96). Rendering module 20 may freeze the currently rendered frame on display 21 by not refreshing the decoded data of frame memory 22. In other words, frame memory 22 maintains the decoded data of the frame that is currently displayed to the user.

Decoding device waits until receiving and rendering operations are synchronized such that rendering of the current superframe occurs at substantially the same time as receiving of the subsequent superframe (98). The receiving and rendering operations may, for example, be synchronized at the playback time associated with the frozen frame. When the receiving and rendering operations are synchronized rendering module 20 begins to render the additional decoded frames of the superframe at the normal rendering rate (99). Rendering module 20 may, for example begin to render the additional decoded frames of the superframe at the playback time of the frozen frame.

Figure 9:
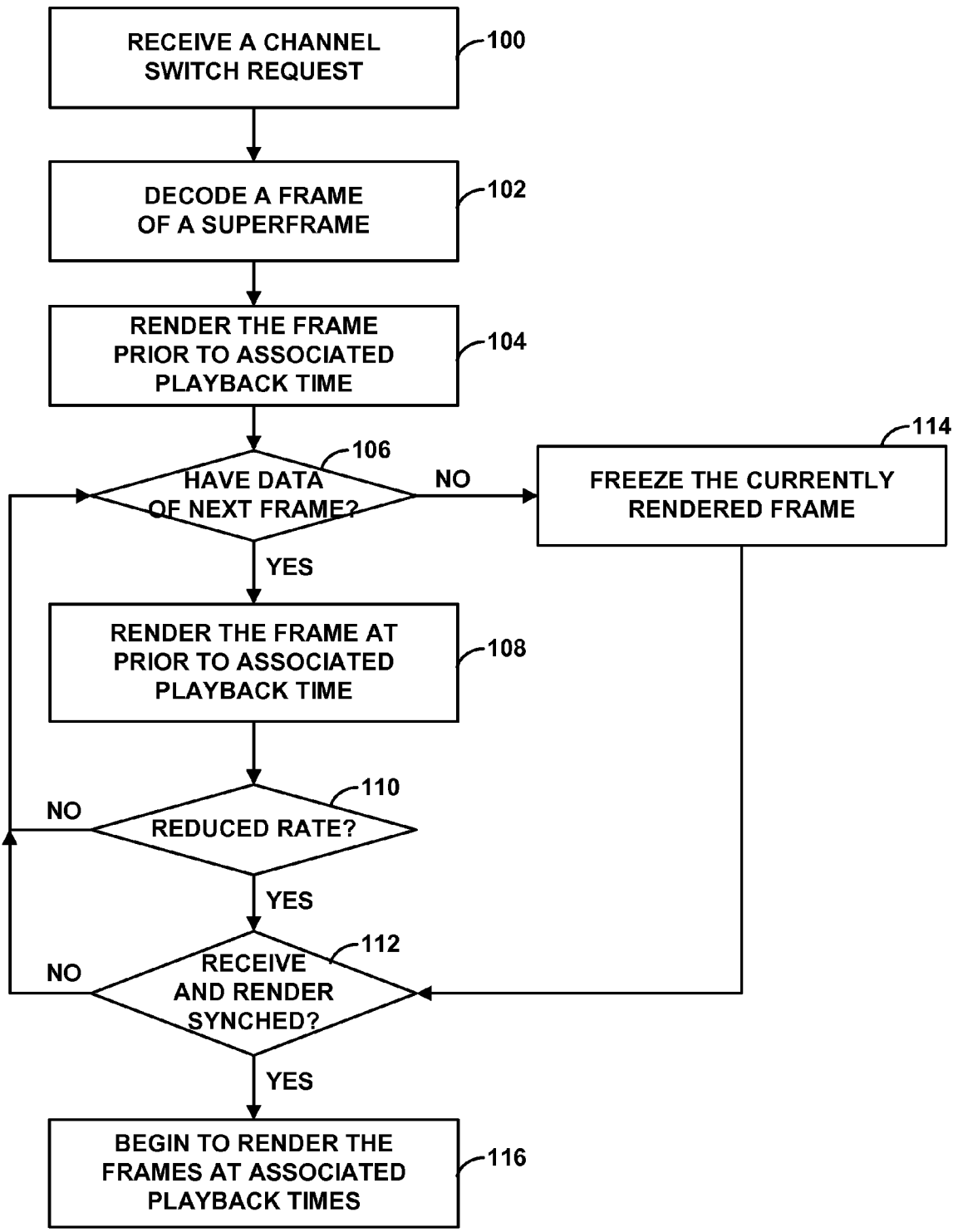
FIG. 9 is a flow diagram illustrating exemplary operation of a decoding device rendering one or more frames prior to their associated playback times.

FIG. 9 is a flow diagram illustrating exemplary operation of a decoding device, such as decoding device 14 of FIG. 1, rendering a plurality of frames of one or more superframes prior to their associated playback times. Initially, decoding module 19 receives a channel switch request (100). The channel switch request may be received from the user via a user interface, such as a channel control button.

Decoding module 19 decodes a frame of a superframe (102). In some cases, decoding module 19 waits until the first RAP of the superframe, e.g., a CSF or I frame. Decoding module 19 may also wait until the first full superframe following the channel switch request before beginning to decode the frames. In other words, if the channel switch request occurs during the middle of a superframe of the new channel, decoding module 19 may wait to decode for the subsequent superframe before decoding the frames. Alternatively, decoding device 14 may not wait for the next superframe 38, but instead, immediately begin to decode the first frame following the channel switch request.

Rendering module 20 renders the decoded frame of the superframe prior to its associated playback time specified in the reference data (104). In certain aspects, rendering module 20 may render the decoded frame immediately after decoding the frame. Alternatively, rendering module 20 may begin to render the frame to display 21 after a specified delay between the decoding and rendering of the frame. In either case, rendering module 20 begins to render the frame prior to their respective playback times specified in the reference data of the superframe. Rendering module 20 may, for example, drive display 21 with data from frame memory 22 to present the decoded data of the frame.

Decoding device 14 determines whether it has data for the next frame (106). Decoding device 14 may monitor for data corruption (errors) in the frames introduced during transmission or loss of data during transmission across a network. In response to detecting corruption in a subsequent frame of the superframe, receiver 18 may wait for an error correction unit associated with the superframe to be received and attempt to correct the error in the frame using the associated error correction unit. Receive 18, therefore, does not provide decoding module 19 with the frame until after the error is corrected using the error correction unit associated with the frame. Rendering module 20 therefore has no decoded frame data to render.

When decoding device 14 does not have decoded data for the subsequent frame, rendering module 20 freezes the currently rendered frame (114). Rendering module 20 may freeze the currently rendered frame on display 21 by not refreshing the decoded data of frame memory 22. In other words, frame memory 22 maintains the decoded data of the frame that is currently displayed to the user.

When decoding device 14 has decoded data for the subsequent frame, rendering module 20 renders the decoded data prior to the associated playback time (108). Rendering module 20 may, for example, refresh the data of frame memory 22 to present the decoded data of the subsequent frame prior to its associated playback time. When rendering data at a normal rendering rate, decoding device 14 determines whether it has data for the next frame (110, 106).

When rendering data at a reduced rendering rate or when a frame is frozen due to an error in a subsequent frame, decoding device 14 determines whether the receiving and rendering operations are synchronized such that rendering of the current superframe occurs at substantially the same time as receiving of the subsequent superframe (112). As described above, the point in time at which the receiving and rendering operations are synchronized may correspond to the point in time when the rendering time of a frame is equal to the associated playback time of the same frame. When rendering data at a reduced rendering rate, the amount of time or number of frames that are rendered before the receiving and rendering operations of decoding device 14 are synchronized depends on the reduced rate at which rendering module 20 renders the frames. As an example, when decoding device 14 renders the frames of the superframe at a rendering rate that is half of the receiving and decoding frame rates, the receiving and rendering operations may be synchronized such that rendering of the current superframe occurs at substantially the same time as receiving of the subsequent superframe after rendering an entire superframe.

When the receiving and rendering operations are not synchronized, decoding device continues to decode frames of the superframe, when decoded data of the frames are available. Moreover, decoding device 14 continues to render the decoded frames of the superframe at the reduced rendering rate. After the receiving and rendering functions of decoding device 14 are synchronized, however, rendering module 20 begins to render frames of the sequence of multimedia data at their associated playback times specified in the reference data of the superframe (116). In other words, rendering module 20 begins to render the frame at the original rendering rate.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

What is claimed is:

1. A method for processing video data, the method comprising:
   decoding at least one coded frame of a plurality of coded frames of at least a portion of a segment of the video data, wherein the at least one coded frame is received subsequent to a channel switch request; and
   rendering, in response to the channel switch request, the at least one decoded frame to a display before a playback time associated with the at least one decoded frame.

2. The method of claim 1, further comprising freezing the at least one rendered frame on the display until the playback time associated with the at least one decoded frame.

3. The method of claim 2, wherein freezing the at least one rendered frame on the display comprises maintaining decoded data of the frame in a frame memory until the playback time associated with the at least one decoded frame.

4. The method of claim 1, wherein rendering the at least one decoded frame to the display comprises rendering the at least one decoded frame to the display at a reduced rendering rate until the playback time associated with a last one of the at least one decoded frame.

5. The method of claim 4, wherein rendering the at least one decoded frame to the display at the reduced rendering rate comprises refreshing decoded data of a frame memory with decoded data of a subsequent one of the frames at a refresh rate that is less than a normal rendering rate.

6. The method of claim 4, further comprising rendering frames to the display at an original rendering rate after the playback time associated with the last one of the at least one decoded frame.

7. The method of claim 6, wherein the reduced rendering rate is one half of the original rendering rate.

8. The method of claim 4, further comprising incrementally increasing the reduced rendering rate at which the frames are rendered to the display.

9. The method of claim 1, further comprising:
   receiving the segment of video data, wherein the received segment includes a data block that includes the plurality of coded frames of video data and an associated error correction unit, and
   decoding the at least one coded frame comprises decoding the at least one coded frame prior to receiving the associated error correction unit.

10. The method of claim 1, further comprising:
    detecting an error within a second frame; and
    freezing the decoded data of the first frame on the display upon detecting the error within the second frame.

11. The method of claim 1, wherein rendering the at least one decoded frame to a display before a playback time associated with the at least one decoded frame comprises rendering decoded data of a first one of the at least one decoded frame to the display and rendering decoded data of a second one of the at least one decoded frame to the display when no error is detected in the second one of the at least one of the decoded frame.

12. The method of claim 1, wherein rendering the at least one decoded frame to the display comprises rendering the at least one decoded frame to the display before the playback time associated with the at least one decoded frame in response to a channel switch request.

13. The method of claim 1, wherein rendering the at least one decoded frame to the display comprises:
    storing the decoded data of the at least one decoded frame in a frame memory; and
    driving the display with the data in the frame memory.

14. An apparatus for processing video data, the apparatus comprising:
    a decoding module that decodes at least one coded frame of a plurality of coded frames of at least a portion of a segment of the video data, wherein the at least one coded frame is received subsequent to a channel switch request; and
    a rendering module that renders the at least one decoded frame to a display before a playback time associated with the at least one decoded frame in response to an event the channel switch request.

15. The apparatus of claim 14, wherein the rendering module freezes the at least one rendered frame on the display until the playback time associated with the at least one decoded frame.

16. The apparatus of claim 15, wherein the rendering module maintains decoded data of the frame in a frame memory until the playback time associated with the at least one decoded frame.

17. The apparatus of claim 14, wherein the rendering module renders the at least one decoded frame to the display at a reduced rendering rate until the playback time associated with a last one of the at least one decoded frame.

18. The apparatus of claim 17, wherein the rendering module refreshes decoded data of a frame memory with decoded data of a subsequent one of the frames at a refresh rate that is less than a normal rendering rate.

19. The apparatus of claim 17, wherein the rendering module renders frames to the display at an original rendering rate after the playback time associated with the last one of the at least one decoded frame.

20. The apparatus of claim 19, wherein the reduced rendering rate is one half of the original rendering rate.

21. The apparatus of claim 17, wherein the rendering module incrementally increases the reduced rendering rate at which the frames are rendered to the display.

22. The apparatus of claim 14, further comprising a receiver that receives the segment of video data, wherein the received segment includes a data block that includes the plurality of coded frames of video data and an associated error correction unit, and wherein the decoding module decodes the at least one coded frame prior to the receiver receiving the associated error correction unit.

23. The apparatus of claim 22, wherein:
    the receiver detects an error within the data block; and
    the rendering module freezes the decoded data of the first frame on the display upon detecting the error within the data block.

24. The apparatus of claim 22, wherein the rendering module renders decoded data of a first one of the at least one decoded frame to the display and renders decoded data of a second one of the at least one decoded frame to the display when no error is detected in the data block.

25. The apparatus of claim 14, wherein the rendering module renders the at least one decoded frame to the display before the playback time associated with the at least one decoded frame in response to a channel switch request.

26. The apparatus of claim 14, wherein the rendering module stores the decoded data of the at least one decoded frame in a frame memory and drives the display with the data in the frame memory.

27. An apparatus for processing video data, the apparatus comprising:
    means for decoding at least one coded frame of a plurality of coded frames of at least a portion of a segment of the video data, wherein the at least one coded frame is received subsequent to a channel switch request; and means for rendering the at least one decoded frame to a display before a playback time associated with the at least one decoded frame in response to the channel switch request.

28. The apparatus of claim 27, wherein the rendering means freezes the at least one rendered frame on the display until the playback time associated with the at least one decoded frame.

29. The apparatus of claim 28, wherein the rendering means maintains decoded data of the frame in a frame memory until the playback time associated with the at least one decoded frame.

30. The apparatus of claim 27, wherein the rendering means renders the at least one decoded frame to the display at a reduced rendering rate until the playback time associated with a last one of the at least one decoded frame.

31. The apparatus of claim 30, wherein the rendering means refreshes decoded data of a frame memory with decoded data of a subsequent one of the frames at a refresh rate that is less than a normal rendering rate.

32. The apparatus of claim 30, the rendering means renders frames to the display at an original rendering rate after the playback time associated with the last one of the at least one decoded frame.

33. The apparatus of claim 32, wherein the reduced rendering rate is one half of the original rendering rate.

34. The apparatus of claim 30, the rendering means incrementally increases the reduced rendering rate at which the frames are rendered to the display.

35. The apparatus of claim 27, further comprising:
means for receiving the segment of video data, wherein the received segment includes a data block that includes the plurality of coded frames of video data and an associated error correction unit,
wherein the decoding means decodes the at least one coded frame prior to receiving the associated error correction unit.

36. The apparatus of claim 27, further comprising:
means for detecting an error within a second frame,
wherein the rendering means freezes the decoded data of the first frame on the display upon detecting the error within the second frame.

37. The apparatus of claim 27, wherein the rendering means renders decoded data of a first one of the at least one decoded frame to the display and renders decoded data of a second one of the at least one decoded frame to the display when no error is detected in the second one of the at least one of the decoded frame.

38. The apparatus of claim 27, wherein the rendering means renders the at least one decoded frame to the display before the playback time associated with the at least one decoded frame in response to a channel switch request.

39. The apparatus of claim 27, wherein the rendering means stores the decoded data of the at least one decoded frame in a frame memory and drives the display with the data in the frame memory.

40. A computer-program product for processing multimedia data comprising a non-transitory computer readable medium having instructions thereon, the instructions comprising:
code for decoding at least one coded frame of a plurality of coded frames of at least a portion of a segment of the video data, wherein the at least one coded frame is received subsequent to a channel switch request; and
code for rendering the at least one decoded frame to a display before a playback time associated with the at least one decoded frame in response to an event the channel switch request.

41. The computer-program product of claim 40, further comprising code for freezing the at least one rendered frame on the display until the playback time associated with the at least one decoded frame.

42. The computer-program product of claim 41, wherein the code for freezing the at least one rendered frame on the display comprises code for maintaining decoded data of the frame in a frame memory until the playback time associated with the at least one decoded frame.

43. The computer-program product of claim 40, wherein the code for rendering the at least one decoded frame to the display comprises code for rendering the at least one decoded frame to the display at a reduced rendering rate until the playback time associated with a last one of the at least one decoded frame.

44. The computer-program product of claim 43, wherein the code for rendering the at least one decoded frame to the display at the reduced rendering rate comprises code for refreshing decoded data of a frame memory with decoded data of a subsequent one of the frames at a refresh rate that is less than a normal rendering rate.

45. The computer-program product of claim 43, further comprising code for rendering frames to the display at an original rendering rate after the playback time associated with the last one of the at least one decoded frame.

46. The computer-program product of claim 45, wherein the reduced rendering rate is one half of the original rendering rate.

47. The computer-program product of claim 43, further comprising code for incrementally increasing the reduced rendering rate at which the frames are rendered to the display.

48. The computer-program product of claim 40, further comprising:
code for receiving the segment of video data, wherein the received segment includes a data block that includes the plurality of coded frames of video data and an associated error correction unit, and
code for decoding the at least one coded frame comprises decoding the at least one coded frame prior to receiving the associated error correction unit.

49. The computer-program product of claim 40, further comprising:
code for detecting an error within a second frame; and
code for freezing the decoded data of the first frame on the display upon detecting the error within the second frame.

50. The computer-program product of claim 40, wherein the code for rendering the at least one decoded frame to a display before a playback time associated with the at least one decoded frame comprises:
code for rendering decoded data of a first one of the at least one decoded frame to the display; and
code for rendering decoded data of a second one of the at least one decoded frame to the display when no error is detected in the second one of the at least one of the decoded frame.

51. The computer-program product of claim 40, wherein the code for rendering the at least one decoded frame to the display comprises code for rendering the at least one decoded frame to the display before the playback time associated with the at least one decoded frame in response to a channel switch request.

52. The computer-program product of claim 40, wherein the code for rendering the at least one decoded frame to the display comprises:
- code for storing the decoded data of the at least one decoded frame in a frame memory; and
- code for driving the display with the data in the frame memory.

\* \* \* \* \*